United States Patent Office 3,126,286
Patented Mar. 24, 1964

3,126,286
PROCESS FOR TREATING SOYBEAN FLOUR
Raymond J. Moshy, Westport, Conn., assignor to General Foods Corporation, White Plains, N.Y., a corporation of Delaware
No Drawing. Filed Aug. 22, 1962, Ser. No. 218,555
6 Claims. (Cl. 99—99)

This invention relates to the production of an improved soybean flour from soybean seed material. More particularly, the invention relates to the production of bland, odorless, substantially color-free soybean flour having improved properties for food use. This application is a continuation-in-part of Serial No. 806,780, filed April 16, 1959, now abandoned.

Because of its low cost and high nutritional value, especially in essential protein, it is a generally recognized fact that the soybean is one of the best and cheapest sources of food energy in terms of calories per unit cost of production, provided it is consumed directly as a human food rather than after conversion to meat in farm animals as is the usual practice today. The greatest obstacle to the general use of soybeans as a source of human food products is the bitter, beany taste and objectionable odor and color of such products when prepared by prior art methods. Another objection to soybean food products, as heretobefore produced, is their poor keeping qualities and their tendency to rancidity in ordinary storage.

Despite the fact that the soybean has been an important source of food to the Asiatic peoples for many centuries, all those well acquainted with the art of soybean processing seem to agree that natural, as well as processed, soybean flour or meal is unacceptable to the American people as regards its palatability and flavor appeal. The very numerous attempts to improve the taste, flavor, odor, color and keeping qualities of soy products date from ancient Chinese history up to the present time and have met with but little success when measured by modern standard food requirements, especially in the United States.

A study of the prior art, and in particular the patent literature, reveals that soy refining methods suggested to date may be grouped in conformity with the following expressed aims.

Methods aiming at the removal or changes of unpalatable consituents, and volatile flavoring or odoriferous substances of whole soybeans, by physical means singly or in a great variety of combinations, such as heating, wetting, soaking or washing in water, pressure or vacuum treatment with inert protective coating or inert gases as protection against oxidation during processing.

Methods aiming at improvements and modifications of odor and flavor with more or less complete deflavoring and deodorizing by chemical means, such as oxidizing agents (hydrogen peroxide), reducing agents (formaldehyde, acetaldehyde), protection-denaturing agents (ethyl alcohol-vapors), neutralizing agents (ammonia vapors), acidifying agents, and metal salts for fixing or precipitating soy constituents which were claimed to be responsible for undesirable flavor and odor.

Methods aiming at the neutralization of the bitter taste and natural odor by effecting reaction of the offensive principles of soy with unknown principles contained in the eleurone particles of wheat, by milling together in the presence of moisture.

Methods aiming at the isolation of soy oil and lecithins from the soybean by solvent extraction at relatively high temperatures and producing more or less deodorized and deflavored soybean meal as a by-product. The flavor of soybean meal obtained by chemical solvent extraction with hydrocarbons, such as hexane, is known to be unacceptable from the food standpoint.

Methods aiming at the isolation of soy protein from soybean meal by solubilization in an acid, alkali or salt solution, followed by removal of the insolubles by mechanical means and then precipitation of the protein from the solution.

The above cited methods of the prior art are generally so vague and indefinite as to leave to the reader's imagination the proper evaluation of such loosely employed terms as "dehydrating, deflavoring, flavor improvements, purifying, flavor refining, analyzing of bitter taste and odor, decoloring," and their application in practical uses in which the yardsticks of technical, chemical and organoleptic analyses may be applied by qualified analysts.

It is an object of the present invention to produce an edible soybean flour, the blandness of flavor and odor of which is characterized by the fact that the flavor and odor of food containing a substantial portion of such edible soy protein flour make the detection of the latter's presence impossible.

It is another object of the present invention to produce an edible soy protein flour of a protein content and of an edible flavor and odor not obtainable by any methods of the prior art.

It is yet another object of the present invention to produce edible and palatable soy protein flours, preferably from solvent (hexane) extracted soy meal, which is a by-product of the commercial solvent extraction of soybean flakes whereby the denaturing of proteins which results in lowered digestibility, lowered usefulness in baking and cooking, both commercial and private, lowered palatability, lowered water-imbibing capacity, and lowered solubility in chemical agents is avoided.

It is a further object of the present invention to produce soy protein flours having, in addition to the properties indicated above, such low coloring power, particularly in the yellow and brown range, that acceptance by the consumer and marketability of food products containing substantial portions of said flours will not be adversely affected.

It is still a further object of the present invention to produce as a new article of manufacture, a soybean protein flour of a protein concentration permitting a substantial concentration of proteins in human foods in the most direct way and at the least expense.

It has now been discovered that the objects of the present invention may be obtained by mixing soybean flour with an acidified aqueous solution, maintaining said mixture under digestion conditions, heating the soybean flour in the presence of moisture to a temperature above 167° F. and separating from the mixture of soybean flour and moisture a soybean flour characterized by its blandness and freedom from odor and color.

While the present invention has been found to be satisfactory in the treatment of all protein-containing seed flours having a beany, nutty and/or bitter off-flavor, it has been found particularly suitable in the treatment of soybean flours. The soybean flour as used in this invention includes dehulled raw soybeans or oil-free soybeans in a cooked, cooked and toasted, or uncooked form which are in a divided state commonly known in the art as flakes, meals, flours, bits, cracked beans, etc. While the present invention is directed primarily to soybean flours as described hereinabove, the process is also eminently satisfactory for removing the beany and bitter flavor from soy proteins which have been extracted and isolated either wholly or in part.

The aqueous solution may be acidified by the addition of any inorganic or organic acid with a relatively high degree of ionization, although it is preferred to employ mineral acids such as hydrochloric, sulfuric, or phosphoric. The term "moisture" as used in the present invention refers to water in the gaseous or liquid state. The term "digestion conditions" as used in the present invention refers to maintaining soybean flour in an acidified aqueous solution at temperatures above 70° F. for a period of time in excess of about one minute.

According to one embodiment of the present invention a bland, odorless soybean flour may be prepared by mixing about 2 to 100 parts by weight of water with one part by weight of defatted, cooked, commercial soybean flour to form a slurry, preferably 2–10 parts by weight of water to one part by weight of soybean flour, 5 parts by weight of water to one part by weight of soybean flour being preferred for ease of handling. To the water-soybean flour slurry is added sufficient acid to adjust the pH to the isoelectric point range of the soy proteins, that is, pH 4–6, and preferably pH 4.5. While the product of the present invention is obtainable when employing an acid pH, optimum results are obtained at about pH 4–6. The product obtained at about pH 4–6 is higher in protein and the flour easiest to handle at such pH since protein hydration and swelling are at a minimum. The slurry of water and soy flour which has been acidified is then heated to temperatures in the order of 70–212° F. and preferably 122–176° F. for optimum color and flavor removal when employing cooked, defatted, commercial soybean flour. The slurry is digested, i.e., maintained, at such temperatures for a period in the order of 1–30 minutes, and preferably 10 minutes when the temperature employed is 176° F. The slurry is digested at the above temperatures for a period sufficiently long to insure complete and intimate contact of all the soybean surfaces with the liquid so that maximum beany and bitter flavor and odor removal may be effected. Periods of time in excess of about 30 minutes at elevated temperatures of treatment cause a substantial increase in the amount of degradation which takes place and concurrently cause an increase in the level of bitterness in the soy flour produced. Furthermore, such excessive periods are not practical for economic reasons. The supernatant liquid is then removed from the digested soybean flour by filtration, centrifugation, or any other common means of separation. The digested soybean flour remains as a filter cake which is further processed. The time and temperature of digestion are in inverse relationship to each other.

The resultant filter cake is washed 1 to 4 or more times by forming a slurry with 3 to 100 parts by weight of water per part by weight of soybean flour originally used. Preferably 2–10 parts by weight of water per part by weight of soybean meal originally used are employed, 5 parts to 1 being preferred for ease of handling. The temperature of the wash water is maintained above 167° F. and preferably above 200° F. Temperatures above 212° F. may be employed during the washing step, the maximum temperature being dependent solely upon the particular combination of time, pH and temperature employed, the only limiting factor being the degree of degradation which is acceptable in the final product. The slurry is maintained at the above wash temperatures for a period sufficiently long to insure complete and intimate contact of all the soybean surfaces with the water so that maximum beany and bitter flavor and odor removal may be effected each time. Preferably, each wash is carried out for 5–60 minutes. The supernatant liquid is removed from the slurry after each wash by any common means of separation. While it has been found with most wash waters that it is not necessary to adjust the pH of the resultant slurry, the pH of the slurry should be maintained between pH 4 and 6. Where the temperature of the acid treatment step is maintained below 167° F., it is essential that the wash be carried out at a temperature above 167° F. in order to obtain a product which is substantially free from the undesirable bitter and beany flavor and odor. Preferably, under such conditions, 5 washes should be employed since they will eliminate the beany and bitter flavors and odor which detrimentally affect the product and remain in products washed fewer times. The wash water removes by dilution the water remaining in the filter cake after treatment with the acidified solution, such water containing undesirable flavors and odor, residual entrained oil, and other water solubles freed by the acid treatment.

It appears that when all of the temperatures during treatment in the heretofore described processes are below 167° F., the flavor and odor components present in the soybean flour are not adequately released. Elevated temperatures above 212° F. may be employed, provided that degradation of the protein does not exceed that desired in the final product. Temperatures above 167° F. permit the release of substantially all of the bitter and beany odor and flavor components which detrimentally affect the final product. Accordingly, where the temperature during acid digestion step is maintained above 167° F., it is not necessary that the temperature of the washing step be maintained above 167° F., a temperature within the range of 70° F. to 212° F. or higher being satisfactory in such case. However, it is preferred that the temperature during the washing step be maintained above 167° F.

If a product having a substantially neutral pH is desired, sufficient alkali may be added to the slurry just prior to the last wash to adjust the pH to 6–8 and preferably 6.8–7.2. However, satisfactory products are obtained if the pH of the product is between 4–9.2. After the last wash, the supernatant liquid is removed from the slurry by drum drying, spray drying, air drying, freeze drying, oven drying, and the like, and preferably spray or freeze drying, spray drying being most preferred for economic reasons. Care should be taken not to roast the product and thereby impart a cereal-like flavor to the flour.

While it has been found that satisfactory results can be obtained by employment of the foregoing embodiment, it has been found according to a more preferred embodiment of the present invention that even more desirable results may be obtained if after washing the filter cake as in the preceding embodiment and prior to neutralization, if employed, a slurry of washed, digested soybean flour is steam distilled by steaming, i.e., passing steam through the slurry, until the weight of vapor condensate collected equals 7–40 times the original weight of the soy flour. The pH of the filter cake prior to distillation is adjusted to pH 4–6 and preferably pH 4.5, if necessary. The product obtained when the weight of vapor condensate collected is more than 10–12 times the weight of the original flour becomes somewhat more bitter as the amount of condensate collected increases. The steam distilled product may then be neutralized by adjusting the pH to 4–9.2 and preferably pH 6–8 and then drying by freeze drying, drum drying, spray drying, air drying, oven drying, and the like. When steam distillation is the treatment employed, it is essential that the acid treated soybean flour be washed if optimum removal of undesirable flavor, odor and color is to be effected.

According to the most preferred embodiment of the present invention, it has still further been found that the bitter and slightly beany flavor and odor which may result when steam distillation is employed can be avoided by steam leaching a slurry of soybean flour and acidified water. Steam leaching as used in the present invention refers to a process wherein steam is passed through the slurry, part of the steam passing off as a vapor which is condensed and part condensing in the slurry. The part which condenses in the slurry increases the volume of the slurry and decreases the solids concentration. Part of the liquid is removed so as to maintain a substantially constant ratio of soybean flour solids to liquid. The excess condensate liquid removed from the slurry contains soluble undesirable, non-volatile flavor and odor components, residual oil, color, etc. This slurry may be filtered or centrifuged to separate the supernatant liquor from the soybean flour, if desired, although separation is not ordinarily necessary. The steam vapor collected as a condensate contains undesirable volatile flavor and odor components.

In carrying out the steam leaching, 1–5 parts by weight of water are mixed with 1 part by weight of soybean flour to form a slurry. The pH of the slurry is adjusted to pH 4–6 and preferably pH 4.5 prior to steam leaching.

The amount of liquid in the slurry during steam leaching is maintained at 1–5 parts by weight of liquid per part by weight of soybean flour present, and any liquid in excess of this amount which forms due to part of the steam condensing in the slurry is removed. One common means of effecting such removal is by placing the slurry in a vessel having a perforated bottom covered with a fine mesh screen and passing a stream of steam through the slurry while permitting excess liquid to pass therethrough at a controlled rate. The screen is kept from plugging by passing the steam or a stream of air across it to prevent the solids from plugging it. In addition, the slurry is agitated so that uniform contact of all particles with the liquid and steam takes place. Under such conditions, the washing and digestion steps described in the preceding embodiments may be eliminated. The excess liquid removed from the slurry contains most of the non-volatile bitter flavor principles which would increase in intensity if permitted to remain in the slurry at elevated temperatures.

When carrying out the process employing steam leaching, the total weight of condensate obtained (steam vapor condensate plus slurry condensate) is 7–40 times the original weight of the flour. It is desired to obtain 5–1 parts by weight of excess liquid removed from the slurry per each 1–5 parts by weight of steam vapor condensate obtained and preferably 2 parts by weight of slurry condensate per part by weight of steam vapor condensate. The slurry may then be neutralized to pH 4–9.2, preferably to pH 6–8 and dried by any common drying means, drum drying being preferred.

The following examples illustrate several embodiments of the present invention:

*Example 1*

One pound of cooked, defatted, commercial soybean flour was mixed with five pounds of water and to this mixture was added sufficient concentrated hydrochloric acid to adjust the pH to 4.5. The resulting slurry was heated to a temperature of 176° F. and maintained at that temperature for ten minutes. The digested slurry was filtered in a vacuum filter and the resultant filter cake was washed five times with five pounds of water at 176° F. Each wash was carried out for 10–15 minutes and the wash water removed from the filter cake by filtration before the last washing. After the last wash the slurry was drum dried on 6" diameter stainless steel rolls internally heated with 25 p.s.i.g. steam and rotating at 2 r.p.m. The resulting product was a cream-colored, bland, odorless soybean flour.

*Example 2*

One hundred grams of cooked, defatted, commercial 120 U.S. standard mesh soy flour were mixed with 500 ml. of water and the pH of the mixture adjusted to pH 4.2 by the addition of 6 ml. of 6 N hydrochloric acid. The temperature of the resulting mixture was raised to 100° C. over a period of 10 minutes and then the mixture digested at 100° C. for an additional 10 minutes. The mixture was filtered and the resulting filter cake was mixed with 500 ml. of warm water. The pH was adjusted to pH 5.4 with sodium hydroxide and the mixture heated for 5 minutes at 100° C. The mixture was filtered and the resulting filter cake was slurried with 500 ml. of warm water and the slurry steam distilled until 1 liter of condensate was collected. The pH of the slurry was adjusted to pH 6.0 and the slurry was air dried at room temperature. Sixty-five grams of a bland, cream-colored, odorless soybean flour were obtained.

*Example 3*

Three hundred grams of 120 U.S. Standard mesh cooked, defatted, commercial soybean flour were mixed with 500 ml. of water having a pH of 6.6. The pH of the mixture was adjusted to pH 4.5 with 28.0 ml. of 6 N hydrochloric acid. The slurry was placed in a steam leaching apparatus comprised of a cylinder having a perforated glass plate at the bottom covered with a filter cloth upon which was placed the acidified water-soybean flour slurry. Steam was passed through the acidified water-soybean flour slurry from beneath and the vapors produced by such steaming carried off to a condenser. The steam vapor which condensed in the acidified water-soybean flour slurry environment was permitted to drain through the filter cloth and perforated glass plate, being aided to some extent by the application of a vacuum. The steaming was carried out for two hours during which time 2 liters of leach water (the water draining through the perforated glass plate) and 1 liter of condensate were collected. The digested soybean flour having a pH of 5.1 was adjusted to pH 6.0, the water being filtered from the soybean flour and the soybean flour then dried. The product was bland, odorless and light tan in color. Two hundred ten grams of the product were obtained.

The product of the present invention is bland in flavor, odorless, cream-colored to white in color, and may be employed in many food products where it is desired to increase the protein content. Such products as potatoes, whipped toppings, meat substitutes, spreads, and the like, are products in which the soy protein flour of the present invention has been found to be very suitable.

Although this invention has been herein described in specific embodiments, it is to be understood that these examples are for purposes of illustration only and that the invention is not limited thereto, reference being had to the appended claims for a definition of the scope of this invention.

What is claimed is:

1. A process for treating a soybean flour characterized by its undesirable flavor, odor and color to produce a bland, odorless, substantially color-free soybean flour which comprises mixing soybean flour with an aqueous solution to form a slurry, adjusting the pH of said slurry to pH 4–6, digesting said slurry at a temperature of 70°–212° F. for 1–30 minutes, the time and temperature of said digesting step being in inverse relationship to each other, separating digested soybean flour from the acidified aqueous solution, washing said digested soybean flour for 5 to 60 minutes with water at a temperature of 70°–212° F. while maintaining the pH of the soybean flour at 4–6, maintaining the temperature of at least one of the steps of digesting and washing at above 167° F., and separating from said slurry of washed, digested soybean flour and water a soybean flour characterized by its blandness and freedom from odor and color.

2. A process for treating a soybean flour characterized by its undesirable flavor, odor, and color to produce a bland, odorless, substantially color-free soybean flour which comprises mixing 1 part by weight of soybean flour with 2–100 parts by weight of water to form a slurry, adjusting the pH of said slurry to pH 4–6, digesting said soybean flour slurry at a temperature of 122°–176° F., maintaining said temperature for 1–30 minutes, the time and temperature of said digesting step being in inverse relationship to each other, separating digested soybean flour from the acidified water, washing the digested soybean flour with 3–100 parts by weight of water per part by weight of original soybean flour at a temperature above 167° F. for 5–60 minutes while maintaining the pH of the soybean flour at 4–6, and separating from said slurry of digested soybean flour and water a soybean flour characterized by its blandness and freedom from odor and color.

3. A process for treating a soybean flour characterized by its undesirable flavor, odor, and color to produce a bland, odorless, substantially color-free soybean flour which comprises mixing 1 part by weight of soybean flour with 2–10 parts by eight of water to form a slurry, adjusting the pH of said slurry to pH 4.5, digesting said soybean flour slurry at a temperature of 176° F. for 10 minutes, separating digested soybean flour from the acidified water, washing the digested soybean flour with 2–10 parts by weight of water per part by weight of original soybean flour at a temperature above 200° F. for 5–60 minutes while maintaining the pH of the soybean flour at 4–6, and separating from the slurry of digested soybean flour and water a soybean flour characterized by its blandness and freedom from odor and color.

4. A process for treating a soybean flour characterized by its undesirable flavor, odor and color to produce a bland, odorless substantially color-free soybean flour which comprises mixing soybean flour with an aqueous solution to form a slurry, adjusting the pH of said slurry to pH 4–6, digesting said slurry at a temperature of 70°–212° F. for 1–30 minutes, the time and temperature of said digesting step being in inverse relationship to each other, separating digested soybean flour from the acidified aqueous solution, washing said digested soybean flour with 3–100 parts by weight of water per part by weight of original soybean flour at a temperature above 167° F. while maintaining the pH of the soybean flour at 4–6, steaming the washed slurry while maintaining the pH of said slurry at pH 4–6 until 7–40 times the original weight of the soybean flour is collected as a steam condensate, and drying the slurry of digested soybean flour to obtain a soybean flour characterized by its blandness and freedom from odor and color.

5. A process for treating a soybean flour characterized by its undesirable flavor, odor and color to produce a bland, odorless, substantially color-free soybean flour which comprises mixing soybean flour with water to form a slurry, adjusting the pH of said slurry to pH 4–6, digesting said slurry at a temperature of 70°–212° °F. for 1–30 minutes, the time and temperature of said digesting step being in inverse relationship to each other, separating digested soybean flour from the acidified aqueous solution, washing said digested soybean flour four times with 2–10 parts by weight of water per part by weight of original soybean flour at a temperature above 167° F. while maintaining the pH of the soybean flour at 4–6, steaming the washed slurry while maintaining the pH of said slurry at pH 4.5 until 10–12 times the original weight of the soybean flour is collected as a steam condensate, and drying the slurry of digested soybean flour to obtain a soybean flour characterized by its blandness and freedom from odor and color.

6. A process for treating a soybean flour characterized by its undesirable flavor, odor and color to produce a bland, odorless, substantially color-free soybean flour which comprises mixing 1 part by weight of soybean flour with 1–5 parts by weight of water to form a slurry, adjusting the pH of said slurry to pH 4–6, steam leaching said slurry without excessively degrading the soy protein while maintaining the water content of said slurry at 1–5 parts by weight of water per part by weight of the original soybean flour, continuing the steam leaching until 7–40 times the original weight of the soybean flour is collected as a total condensate, and drying the steam leached soybean flour slurry to obtain a soybean flour characterized by its blandness and freedom from odor and color.

References Cited in the file of this patent
UNITED STATES PATENTS

| | | |
|---|---|---|
| 1,314,298 | Yomamoto | Aug. 26, 1919 |
| 2,052,215 | Cohn | Aug. 26, 1936 |
| 2,238,329 | Julian | Apr. 15, 1941 |
| 2,534,228 | Calvert | Dec. 19, 1950 |
| 2,881,076 | Sair | Apr. 7, 1959 |

FOREIGN PATENTS

| | | |
|---|---|---|
| 551,692 | Great Britain | Mar. 5, 1943 |

OTHER REFERENCES

"Soybeans and Soybean Products," 1950, by Markley, Interscience Publishers, Inc. (New York), vol. I, page 280; vol. II, pages 954 to 956. (Copy in Division 63.)